US006877659B2

(12) United States Patent
Abramsohn

(10) Patent No.: US 6,877,659 B2
(45) Date of Patent: Apr. 12, 2005

(54) GYRICON PLATEN COVER FOR SHOW-THROUGH CORRECTION

(75) Inventor: Dennis A. Abramsohn, Boise, ID (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 10/378,137

(22) Filed: Feb. 27, 2003

(65) Prior Publication Data

US 2004/0065737 A1 Apr. 8, 2004

Related U.S. Application Data

(60) Provisional application No. 60/416,513, filed on Oct. 4, 2002.

(51) Int. Cl.[7] ................................. G06K 7/10
(52) U.S. Cl. ..................... 235/454; 358/494; 358/474; 358/497
(58) Field of Search ............................ 235/454, 462.45, 235/472.01; 358/494, 474, 497, 504; 399/207, 377, 379, 380, 411, 350, 64; 349/3, 2, 113; 355/75

(56) References Cited

U.S. PATENT DOCUMENTS

| | | | | |
|---|---|---|---|---|
| 4,126,854 A | * | 11/1978 | Sheridon | 345/107 |
| 5,053,818 A | * | 10/1991 | Smith | 399/47 |
| 5,416,572 A | * | 5/1995 | Kolb et al. | 399/350 |
| 5,418,119 A | * | 5/1995 | Simons | 430/507 |
| 5,722,029 A | * | 2/1998 | Tomidokoro et al. | 399/389 |
| 5,748,344 A | * | 5/1998 | Rees | 358/505 |
| 5,790,211 A | * | 8/1998 | Seachman et al. | 349/3 |
| 5,926,684 A | * | 7/1999 | Horiuchi et al. | 399/402 |
| 5,966,503 A | * | 10/1999 | van Vliembergen et al. | 358/1.6 |
| 6,136,492 A | * | 10/2000 | Hardy et al. | 430/115 |
| 6,198,088 B1 | * | 3/2001 | Seachman | 250/208.1 |
| 6,288,798 B1 | * | 9/2001 | Sharma | 358/448 |
| 6,470,099 B1 | * | 10/2002 | Dowdy et al. | 382/287 |
| 6,519,424 B2 | * | 2/2003 | Matsuura et al. | 399/45 |
| 2001/0022908 A1 | * | 9/2001 | Mikita | 399/324 |
| 2001/0048416 A1 | * | 12/2001 | Miyamoto et al. | 345/87 |
| 2002/0036616 A1 | * | 3/2002 | Inoue | 345/107 |
| 2002/0093694 A1 | * | 7/2002 | Spears | 358/474 |
| 2002/0126299 A1 | * | 9/2002 | Buchar et al. | 358/1.9 |
| 2002/0164172 A1 | * | 11/2002 | Tsubaki et al. | 399/45 |
| 2002/0176719 A1 | * | 11/2002 | Yogome et al. | 399/81 |
| 2003/0020187 A1 | * | 1/2003 | Sacripante | 264/1.7 |
| 2003/0133172 A1 | * | 7/2003 | Hsieh et al. | 358/504 |
| 2003/0184820 A1 | * | 10/2003 | Han et al. | 358/494 |
| 2004/0022452 A1 | * | 2/2004 | McCoy | 382/284 |
| 2004/0041785 A1 | * | 3/2004 | Stevens et al. | 345/107 |
| 2004/0070798 A1 | * | 4/2004 | Andersen et al. | 358/498 |
| 2004/0174556 A1 | * | 9/2004 | Lapstun et al. | 358/1.14 |

* cited by examiner

Primary Examiner—Thien M. Le
Assistant Examiner—Allyson N Trail
(74) Attorney, Agent, or Firm—Oliff & Berridge, PLC

(57) ABSTRACT

A gyricon platen cover provides a black background behind an original document and a white background surrounding the document to mitigate show-through of the back side of the document while the front side of the document is being scanning. The gyricon platen cover also provides a black background for the document for pre-scan detection of the location of the edges of an original document for electronic registration, electronic skew correction and automatic magnification selection during scanning of the original document.

14 Claims, 10 Drawing Sheets

GYRICON PLATEN COVER FOR SHOW-THROUGH CORRECTION

This application is based on a Provisional Patent Application No. 60/416,513, filed Oct. 4, 2002.

BACKGROUND OF THE INVENTION

The present invention relates generally to scanning two-sided documents in a raster scanning system and, more particularly, to a gyricon platen cover to mitigate show-through of the back side of the document while the front side of the document is being scanned.

Electronic document scanners, copiers, and facsimile machines transform an optical image of an original document into an electric signal suitable for storing, displaying, printing or electronic transmission. A typical photographic copying machine is provided with a transparent platen which supports an original document during the copying process. The transparent platen allows the graphic information on the front side of the original document to be scanned by the optical system within the copying machine.

A platen cover is pivotably mounted by a suitable hinge system adjacent to the platen. The platen cover is swung up to an open position for placement of the document face down on the transparent platen to be copied or scanned by illumination from within the photocopy machine. The platen cover is swung down to a position covering the platen to hold and secure the original document on the transparent platen. The lower surface of the platen cover is the background for the document during illumination for copying or scanning. The platen cover is swung up to an open position for removal of the document from the platen. Alternately, the platen cover can remain down and the document fed between the platen and the platen cover by belt or other means and removed after illumination for copying and scanning by the same means.

The original document is illuminated by a high intensity light source for photocopying. Typical techniques for illuminating the document are scanning, which involves a relative movement between the original document and the source of illumination, or by a full-frame high intensity flash exposure of the original document while both the document and the light source remain stationary.

Light is reflected off an image on the front side of the original document onto a photosensitive medium, or an array of photosensitive sensor elements. In the former case of the photosensitive medium, the scanning system projects an image of the graphic information to the photosensitive medium thereby creating a latent electrostatic image of the graphic information on the photosensitive medium. The latent image is developed on the photosensitive medium by the application of colored marking material, which is transferred to another support material, usually plain paper, to form a photocopy of the graphic information on the original document. In the later case of the array of photosensitive sensor elements, the graphic image information received by the photosensitive sensor elements will be stored electronically for copying, printing or transmission.

In scanning, the scan of one side of a typical two-sided piece of paper may contain images from both sides of the page. Light shining on the front side of the original document being scanned is transmitted through the document and is reflected by the image on the back side. The image on the back side, whether black or in a color, whether solid or grey scale, produces varying amounts of light back to the front side. The high contrast image of the front side will be combined with a low contrast version of the mirror image from the back side of the page during the scanning. This low contrast image from the back side of the page is called "show-through".

With only the scanned image from one side, there is no way of distinguishing between the low contrast "show-through" image from the back side and any low contrast image scanned from the front side of the page.

When the back side is scanned, the same occurs with a low contrast mirror image of the front side.

The platen cover typically has a high diffuse reflectance, white, lower surface, adjacent to the back side of the original document and the transparent platen, to provide a white background for a photocopy of an original document that does not fill the platen area to prevent black framing in copies of less than full-size original documents.

However the contrast of the white surface of the platen cover behind the document with the black image on the back side of the document is the cause of show-through when the front side of the document is being scanned.

Another problem is the lack of contrast between the white surface of the platen cover and the edges of the white or light colored original document which makes detection of the original document's edges difficult for the scanner. A pre-scan detection of the location of the original document's edges enables the scanner to provide electronic registration and electronic skew correction for the subsequent scanning of the original document. Moreover, the detection of the location of the input document's edges enables the digital scanner to provide automatic magnification selection. However, this edge detection depends upon the ability of the digital scanner to sense the difference in the diffuse reflectance between the original document's background and the surrounding platen cover surface.

Alternately, the platen cover can have a non-reflectance black lower surface, adjacent to the back side of an original document and the transparent platen, to provide a black background for a photocopy of the original document. The light that passes through the original document will be absorbed by the black surface of the platen cover substantially reducing a show-through image being scanned.

The platen cover with a black surface allows the unambiguous detection of the edges of a white or light colored document by the scanner for electronic registration, electronic skew correction and automatic magnification selection.

However, the black surface platen cover behind the original document may cause other problems during scanning such as dark borders around the original document, dark circles or other shapes where punch holes or perforations exist in the original document, and dark borders around multiple images such as multiple original documents on a single scan.

It is an object of the present invention to provide a platen cover with a black background behind the document and a white background surrounding the document to mitigate show-through of the back side of the document while the front side of the document is being scanning.

It is another object of the present invention to provide a platen cover with a black background for pre-scan detection of the location of the edges of an original document on the platen for electronic registration, electronic skew correction and automatic magnification selection by the scanner.

SUMMARY OF THE INVENTION

According to the present invention, a gyricon platen cover provides a black background behind an original document and a white background surrounding the document to mitigate show-through of the back side of the document while the front side of the document is being scanned.

The gyricon platen cover also provides a black background for the document for pre-scan detection of the location of the edges of an original document for electronic registration, electronic skew correction and automatic magnification selection during scanning of the original document.

Other objects and attainments together with a fuller understanding of the invention will become apparent and appreciated by referring to the following description and claims taken in conjunction with the accompanying drawings.

BRIEF DESCRIPTION OF THE DRAWINGS

A more complete appreciation of the invention and many of the attendant advantages thereof will be readily obtained and understood by referring to the following detailed description and the accompanying drawings in which like reference numerals denote like elements as between the various drawings. The drawings, briefly described below, are not to scale.

DETAILED DESCRIPTION

In the following detailed description, numeric ranges are provided for various aspects of the embodiments described. These recited ranges are to be treated as examples only, and are not intended to limit the scope of the claims hereof. In addition, a number of materials are identified as suitable for various facets of the embodiments. These recited materials are to be treated as exemplary, and are not intended to limit the scope of the claims hereof. In addition, the figures are not drawn to scale for ease of understanding the present invention.

Figure 1:
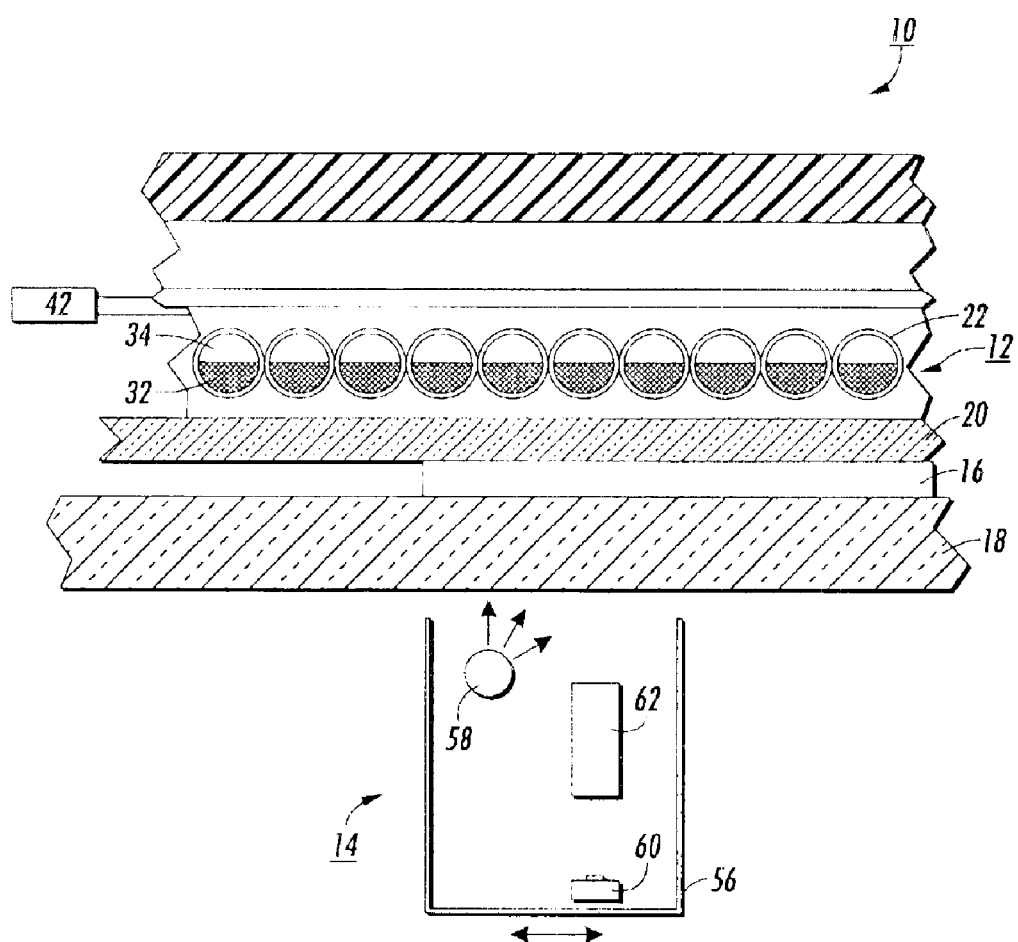
FIG. 1 is a cross-sectional side view of a gyricon platen cover for a digital raster scanner of the present invention.

Referring now to the drawings where the showings are for the purpose of illustrating a duplex scanning system implementing the show-through correction process described in the parent application, FIG. 1 shows a raster input scanner 14 for generating an electronic representation of an image on a document. At this point of the description, the present application is primarily concerned with providing a background description of "duplex" documents, i.e., original documents with images on both faces thereof. "Image" as used herein refers to the information on the document, for which scanning is desired, and which will be in some manner copied to another substrate or medium or to an electronic storage medium. "Scanning" as used hereinafter, refers to the relative movement of photosensitive sensors with respect to documents for the purpose of acquiring an electronic representation of the image or information about the image.

FIG. 1 is simplified in that scanning devices typically include lenses, mirrors and other optical components not relevant to the invention. It should be noted that FIG. 1 may represent a copier, facsimile or scanner. In the interest of simplicity, a scanner will be described. However, the present invention also applies to copiers and facsimiles. The present invention also applies equally well to flat bed/stationary document machines or automatic document feeding machines.

Reference is now made to FIG. 1, wherein there is illustrated a platen cover 10 with a gyricon sheet 12 for a digital raster input scanner 14 to mitigate show-through in an original document 16 in accordance with this present invention.

The original document 16 is placed on the transparent platen 18 of the scanner 14. The platen cover 10 is closed on the document 16 and the platen 18. The platen cover 10 includes a gyricon sheet 12 on the lower surface 20 of the platen cover. The gyricon sheet 12 is positioned between the platen cover 10 and the platen 18 (and the document 16 on the platen 18).

Typically, the scanner 14 has a rectangular platen 18 and the generally rigid, generally rectangular platen cover 10 preferably has a surface area equal to or slightly larger than the surface area of the platen 18 so that, when closed, the platen cover 10 completely covers the platen 18 and the document 16 on the platen 18.

The gyricon sheet 12 of the platen cover 10 is disclosed in various patents and articles, such as U.S. Pat. No. 4,126,854 by Sheridon titled "Twisting Ball Display", commonly assigned as the present application and herein incorporated by reference. The gyricon sheet is comprised of an elastomeric host layer a few mils thick which has densely and evenly spaced two-dimensional array of rotating elements, usually spheres, tens of microns in diameter. Each bichromal rotating element has halves of contrasting colors, such as a white half and a black half, and forms a single white or black picture element or pixel. Each bichromal rotating element also possesses an electric dipole, orthogonal to the plane that divides the two colored halves. Each bichromal rotating element is contained in its own cavity filled with a dielectric liquid. Upon application of an electric field between electrodes, the rotating elements will rotate depending on the polarity of the field, presenting either the white side or the black side to an observer.

Rotation of the bichromal rotating elements to show a black or white pixel side is accomplished by imposing an electrical pattern over the sheet, where there is a voltage difference between the top side and the bottom side. The response pattern of the bichromal rotating element to an external electrical field determines the types of addressing that may be used to create images on the gyricon electric paper sheet.

In active matrix addressing, a separate addressing electrode is provided for each bichromal rotating element or pixel of the gyricon electric paper sheet and each of these electrodes is continuously supplied with an addressing voltage. The complete set of voltages can be changed for each addressing frame. The second type of addressing scheme is passive matrix addressing. Passive matrix addressing makes use of two sets of electrodes, one on each orthogonal side of the display medium. Typically, one of these consists of horizontal conductive bars and the other consists of vertical conductive bars. The bars on the front surface of the gyricon sheet are necessarily transparent. To address the display medium, a voltage is placed on a horizontal conductive bar and a voltage is placed on a vertical conductive bar. The segment of medium located at the intersection of these two bars experiences a voltage equal to the sum of these two voltages.

Passive addressing is less complicated and more energy efficient than active addressing because the pixels formed by the black and white sides of the bichromal rotating elements of the gyricon sheet are addressed only for as long as is required to change their optical states. However, the requirements for a medium that can be addressed with a passive matrix display are significantly greater than for the active matrix case. The medium must respond fully to the full addressing voltage but it must not respond to ½ the full addressing voltage. This is called a threshold response behavior. The medium must also stay in whichever optical state it has been switched into by the addressing electrodes without the continuous application of voltage, that is it should store the image without power.

Figure 2:
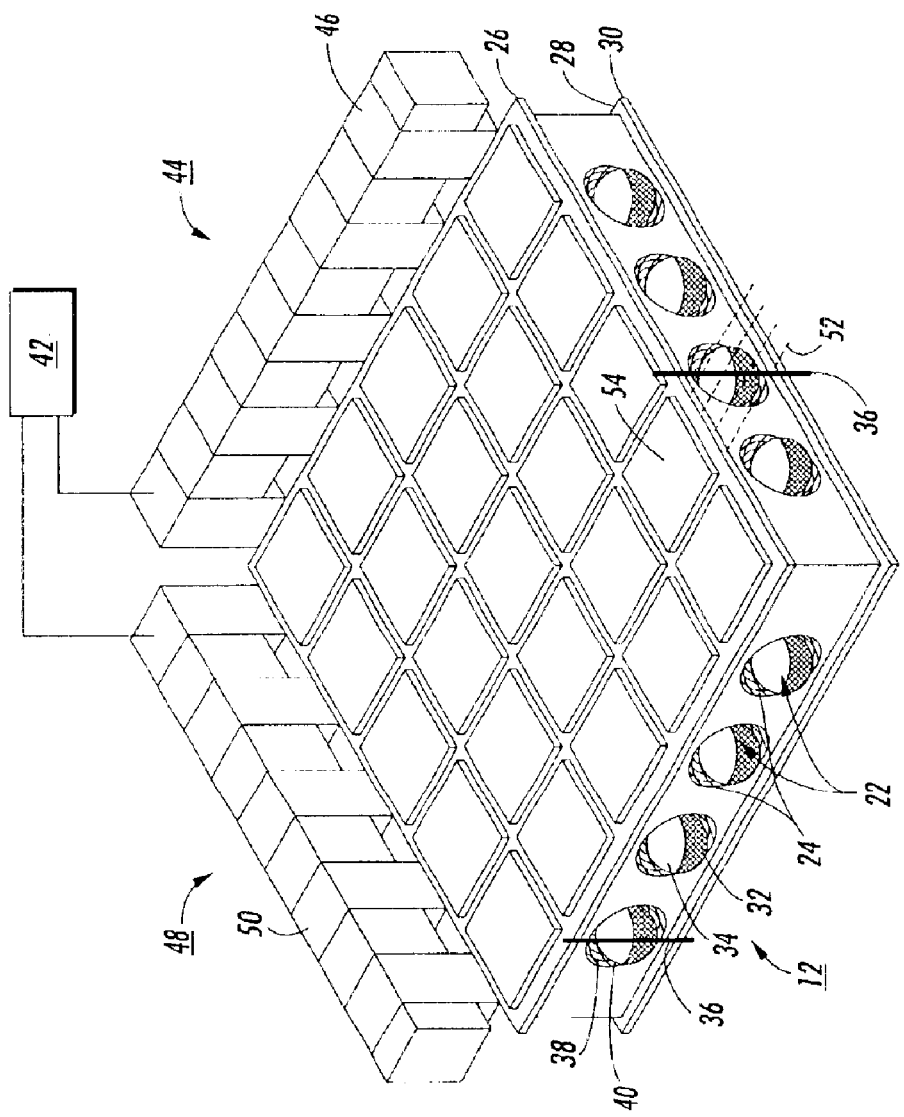
FIG. 2 is a cross-sectional side view of the gyricon sheet for the gyricon platen cover of FIG. 1.

As seen in FIG. 2, the gyricon electric paper sheet 12 has a two-dimensional array of spherical bichromal rotating elements 22, with a diameter of ten microns, cast in a retaining medium 24. The bichromal rotating elements 22 and the retaining medium 24 are contained between a first encapsulating layer 26 and a second encapsulating layer 28. The sheet 12 and encapsulating layers 26, 28 are placed in proximity to a supporting back plane 30 on the platen cover 10 that is electrically grounded.

The bichromal rotating elements 22 have a black half 32 and a white half 34 and form a single picture element or pixel. Each bichromal rotating element 22 also possesses an electric dipole 36, orthogonal to the plane that divides the two colored halves. Each bichromal rotating element 22 is contained in its own cavity 38 in the retaining medium 24 filled with a dielectric liquid 40.

Passive matrix addressing of the array of bichromal rotating elements can be accomplished by multiplexing row and column electrode signals from a gyricon controller 42. The horizontal line 44 of row electrodes 46, one electrode 46 for each row of bichromal rotating elements 22, run along one side of the gyricon sheet 12 in the x-direction. The vertical line 48 of column electrodes 50, one electrode 50 for each column of bichromal rotating elements 22, run along one side of the gyricon sheet 12 in the y-direction. The horizontal line 44 of row electrodes 46 is orthogonal to the vertical line 48 of column electrodes 50 providing an x-y plot for the two dimensional array of bichromal rotating elements 22.

The electrical signal from one row electrode 46 and one column electrode 50 from addressing logic of the gyricon controller 42 generates an electrical field 52 between the intersection 54 of the electrodes 46 and 50 on the first layer 26 and the electrically conductive ground plane 30 disposed on the second layer 28 of the gyricon sheet 12. The electric field 52 effects the electric dipole 36 of the bichromal rotating element 22 which causes the bichromal rotating element 22 at the intersection of that row and column to rotate, depending on the polarity of the field, presenting either the white side 34 or the black side 32 to an observer through the transparent top surface 26 and transparent electrodes 46 and 50.

The closely spaced rotating elements 22 from a background of black pixels 32 or white pixels 34 for the document on the platen. The white side 34 or white pixel on the surface 26 of the gyricon sheet 12 can be the default for the platen cover 10 providing a high diffuse reflectance white lower surface to the platen cover. An electrical signal from the addressing logic 42 will rotate the bichromal rotating element 22 to show its black side 32 or a black pixel on the surface 26 of the gyricon sheet 12 of the platen cover 10. The black pixels will provide a non-reflectance black lower surface to the platen cover. A second signal from the addressing logic will rotate the bichromal rotating element 22 back to its white side 34 or a white pixel.

The electric field 52 between the intersection 54 of the electrodes 46 and 50 and the common ground plane 30 only effects the corresponding bichromal rotating element 22. The electric field 52 does not effect adjacent bichromal rotating elements.

An electrical signal from just a row electrode 46 or just a column electrode 50 is insufficient to rotate the bichromal rotating element 22. Rotation of the element 22 requires an electrical signal from a row electrode 46 and a column electrode 50.

Returning to FIG. 1, a scanning assembly 56 of the scanner 14 reciprocates back and forth below the platen 18. The scanning assembly 56 includes a light source 58, a sensor 60, and an imaging lens 62. The light source 58 may be provided separately from the scanning assembly 56 and the sensor 60 may be an array of sensors.

The lens 62 may, for example, be a conventional SELFOC™ lens that is formed as a plurality of 1:1 lens elements, or may include a plurality of reduction lenses, or a single reduction lens. The particular lens or lens configuration will depend, for example, on the type of sensor used, and will be obvious and predictable to those skilled in the art, as the implementation of scanning assemblies such as the scanning assembly 56 is well understood by those skilled in the art.

In both the pre-scan document detection stage and in the scanning stage by the digital scanner 14, the light source 58 will illuminate the document 16 and the gyricon sheet 12 of the platen cover 10 through the transparent platen 18.

The lens 62 collects light from the graphic image on the document 16 and from any black pixels 32 of the bichromal rotating elements 22 of the exposed gyricon sheet 12, not covered by the document 16, that surround the document 16 and extend beyond the document's edges. The lens 62 produces an image of the document 16 on the sensor 60. The sensor 60 converts this light image to a corresponding electrical signal image.

When the original document 16 is lying upon the platen 18 with the platen cover 10 closed, the gyricon controller 42 electrically switches each individual bichromal rotating element 22 of the exposed gyricon sheet 12 so as to provide a black background or a white background or a precisely controlled black and white background for the platen cover 10 behind the document 16 and surrounding the document 16.

In a preferred embodiment of the present invention, the digital scanner 14, through the controller 42, will cause a voltage to be applied to the gyricon sheet 12, thereby providing a non-reflectance black background of black pixels 32 across the surface 26 of the gyricon sheet 12 surrounding and behind the document 16. Thereafter, the digital scanner will perform a pre-scan or first scan of the document to detect the document's edges. This detection is carried out by conventional software routines or hardware circuits. After the document's edges are detected, the digital scanner 14, through the controller 42, selectively applies the voltage to the gyricon sheet 12 so as to provide a black background of black pixels 32 behind the original document to prevent show-through and a high diffuse reflectance white background of white pixels 34 surrounding the document. The digital scanner will then perform a full scan or second scan of the document so that a full digitization of the image on the document can be realized without show-through.

Figure 3:
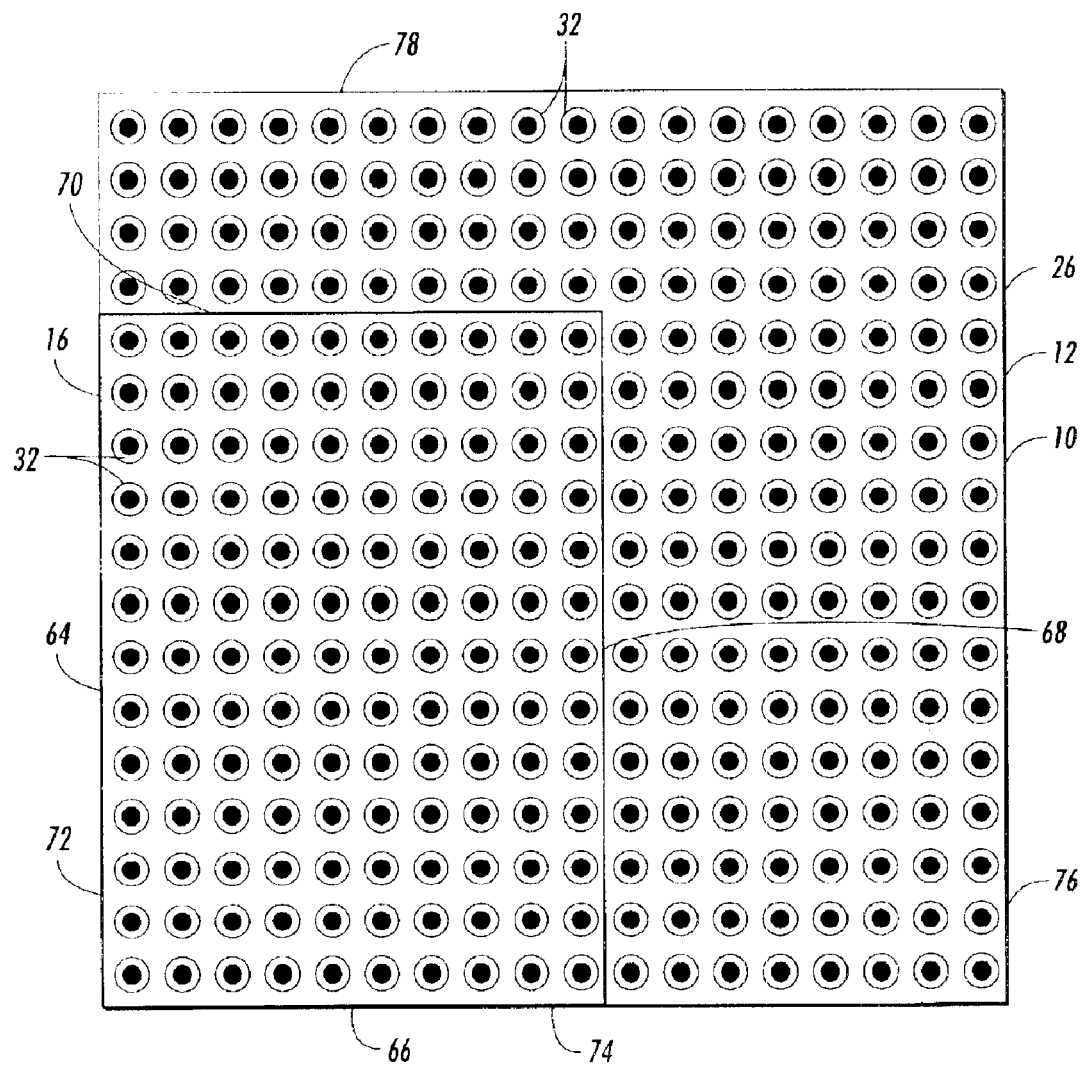
FIG. 3 is a front view of a document in the corner of the platen during pre-scan with a black pixel background from the gyricon sheet platen cover surrounding and behind the document in accordance with the present invention.

FIG. 3 illustrates a document 16 covering a portion of the black pixels of a black background across the surface 26 of the gyricon sheet 12 of the closed platen cover 10 during the pre-scan to detect the document's edges 64, 66, 68 and 70 in accordance with this invention. In this Figure, the document 16 is in the preferred scanning or copying position of corner registration with document edge 64 against platen edge 72 and document edge 66 against platen edge 74. The black pixels 32 of the black background of the platen cover 10 gyricon sheet 10 are visible between the document edge 68 and the platen edge 76, and the document edge 70 and the platen edge 78.

The black pixels behind the document in this and subsequent Figures are shown exaggerated for ease of understanding the invention. The black pixels would not be visible to the scanner during the pre-scan and scanning operation.

The black pixels in this and subsequent Figures are shown widely spaced also for ease of understanding. The density of pixels in the present invention is much higher.

Figure 4:
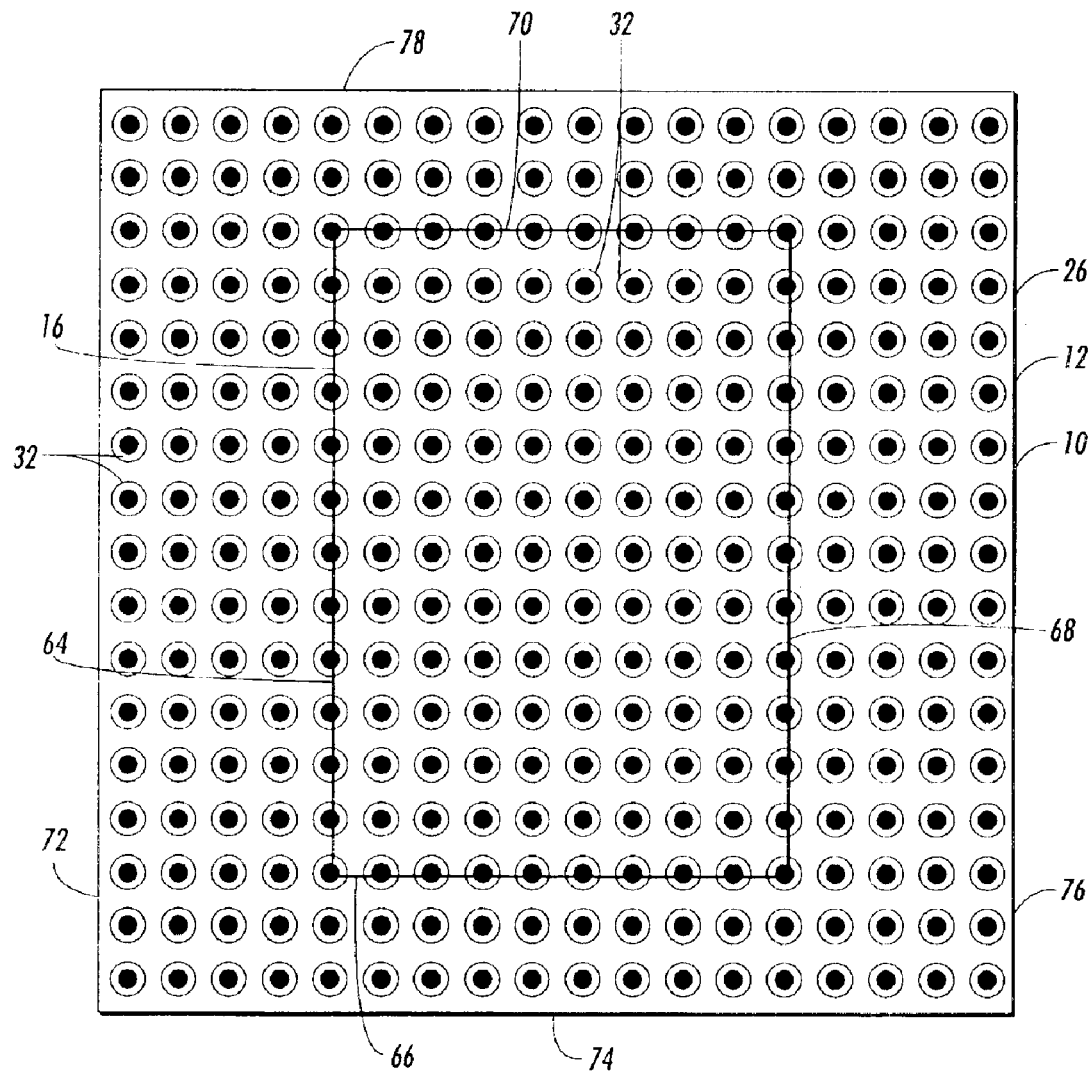
FIG. 4 is a front view of a document centered on the platen during pre-scan with a black pixel background from the gyricon sheet platen cover surrounding and behind the document in accordance with the present invention.

FIG. 4 illustrates a document 16 covering a portion of the black pixels of a black background across the surface 26 of the gyricon sheet 12 of the closed platen cover 10 during the pre-scan to detect the document's edges 64, 66, 68 and 70 in accordance with this invention. In this Figure, the document 16 is in the alternate scanning or copying position of centered registration with document edge 64 an equal distance from platen edge 72 as opposing document edge 68 is from opposing platen edge 76 and document edge 66 an equal distance from platen edge 74 as opposing document edge 70 is from opposing platen edge 78. The black pixels 32 of the black background of the platen cover 10 gyricon sheet 10 are visible between the document edge 64 and the platen edge 72, the document edge 66 and the platen edge 74, the document edge 68 and the platen edge 76, and the document edge 70 and the platen edge 78. The document 16 is centered on the platen 10 and centered on the black background of the platen cover 12.

Figure 5:
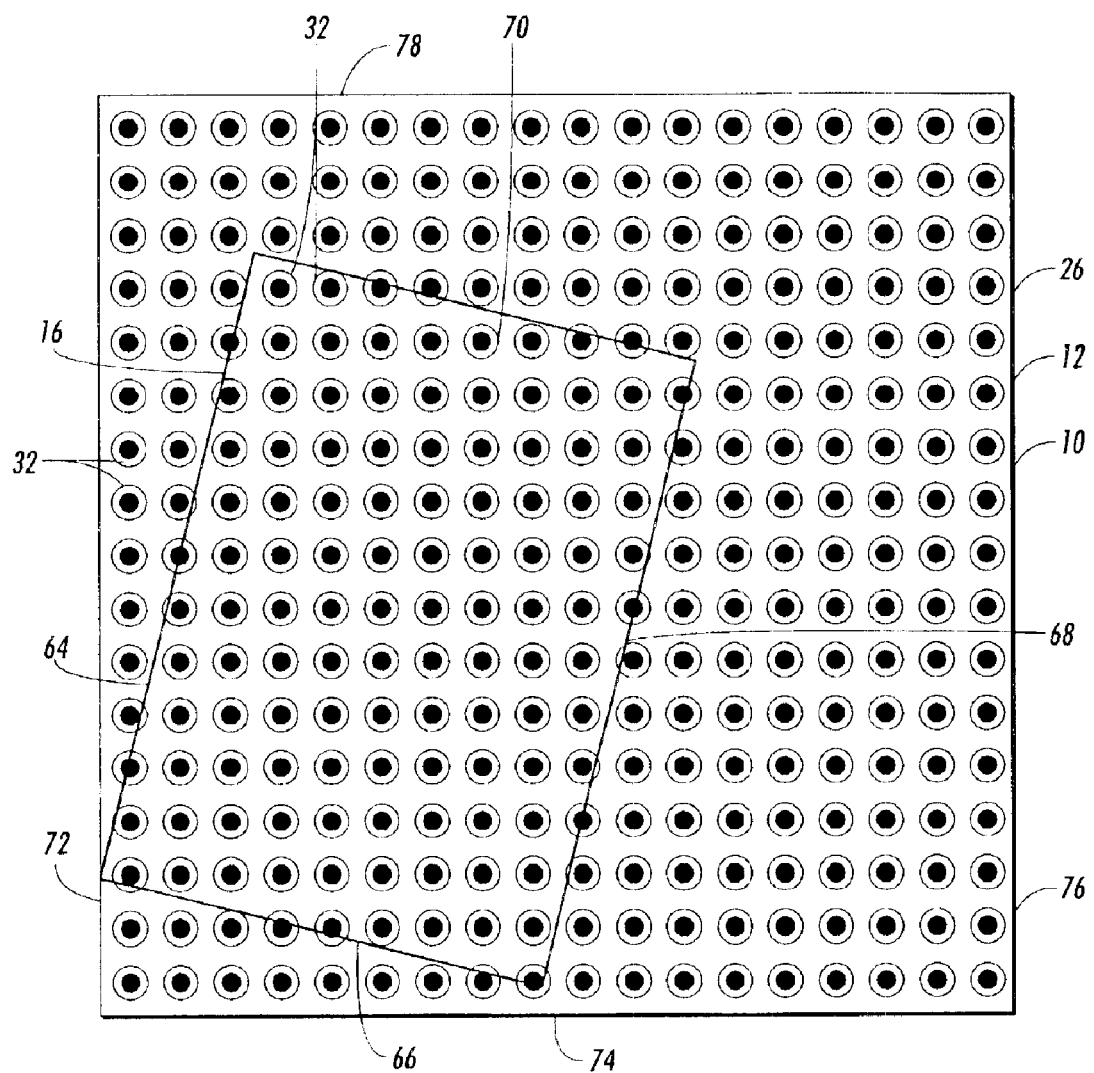
FIG. 5 is a front view a document skewed on the platen during pre-scan with a black pixel background from the gyricon sheet platen cover surrounding and behind the document in accordance with the present invention.

FIG. 5 illustrates a document 16 covering a portion of the black pixels of a black background across the surface 26 of the gyricon sheet 12 of the closed platen cover 10 during the pre-scan to detect the document's edges 64, 66, 68 and 70 in accordance with this invention. In this Figure, the document 16 is in a common positioning error with the document 16 in a skew position relative to the platen 10 and the platen cover 12. Document edge 64 is separated and angled from platen edge 72 and document edge 66 is separated and angled from platen edge 74. The black pixels 32 of the black background of the platen cover 10 gyricon sheet 10 are visible between the document edge 64 and the platen edge 72. The black pixels 32 of the black background of the platen cover 10 gyricon sheet 12 are also visible between the document edge 66 and the platen edge 74. The document edge 68 is skewed relative to the platen edge 76 and the document edge 70 is skewed relative to the platen edge 78.

Based upon the positions of the detected black pixels 32 in FIGS. 3, 4, and 5, the size, location, and/or orientation of the document 16 can be detected. Deskewing, registering, and/or resizing of a copy that is made from the original document 16 can be performed using conventional image processing algorithms, once the size, location, and/or orientation of the document 16 is known.

Figure 6:
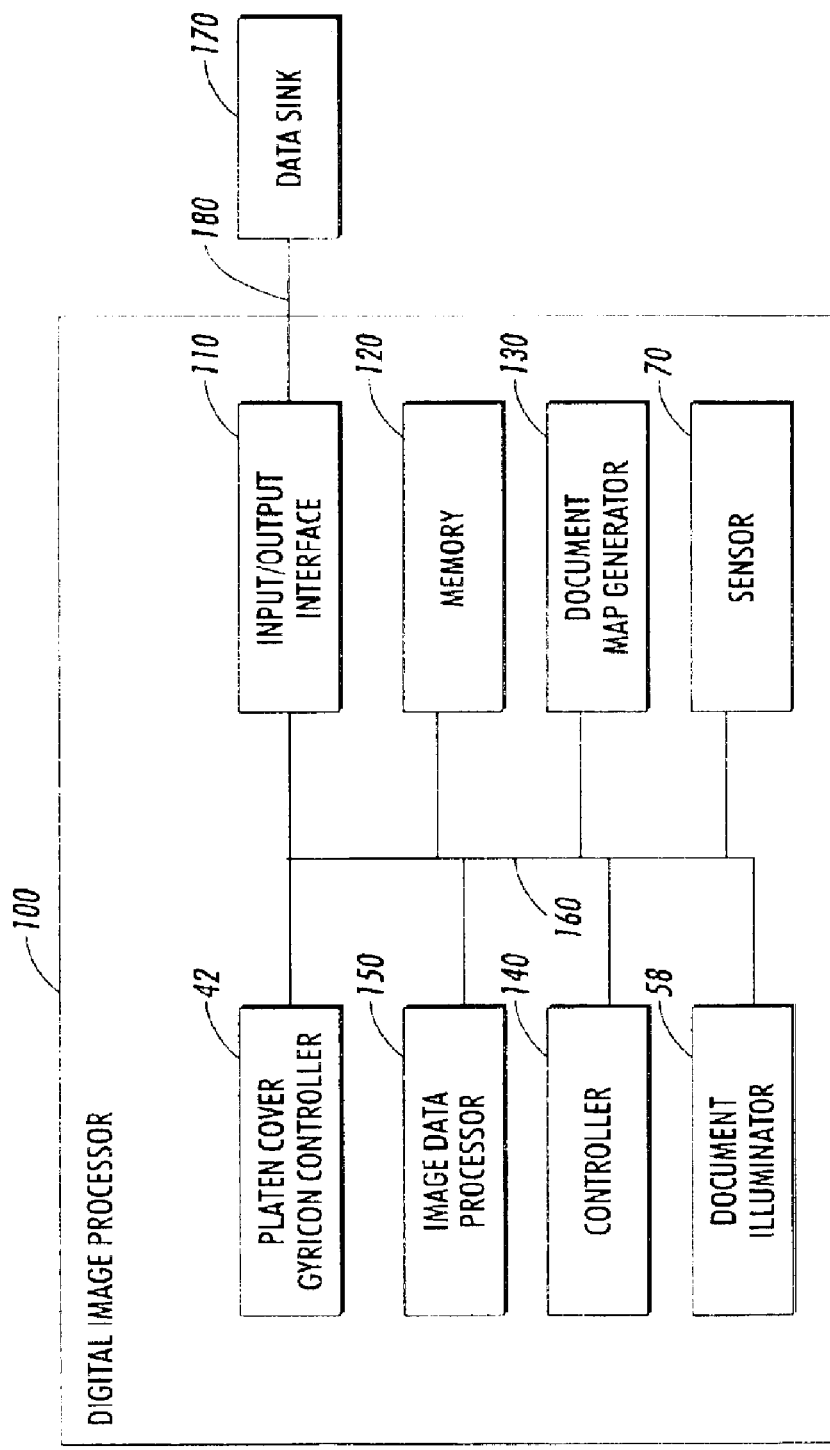
FIG. 6 is a functional block diagram of a digital image processor to determine the edges of a document against a gyricon sheet platen cover in accordance with the present invention.

FIG. 6 shows a functional block diagram of one exemplary embodiment of a digital image processor 100 according to this invention. The digital image processor 100 includes an input/output interface 110, a memory 120, a platen cover gyricon controller 42, a document map generator 130, a controller 140, an image data processor 150, and the document illuminator 58 and the sensor 70 of FIG. 1, all of which are interconnected by a data/control bus 160. The digital image processor 100 shown in FIG. 5 is connected to a data sink 170 over a signal line or link 180. Alternatively, the data sink 170 may be an integral part of the digital image processor 100, and connected directly to the data/control bus 160. An example of this alternative configuration would be a digital copier or the like. Also, alternately the gyricon controller 42 can be part of the digital image processor controller 140.

As shown in FIGS. 1 and 6, the platen cover gyricon sheet 12 through gyricon controller 42 and the document illuminator 58 are controlled by the controller 140. During the pre-scan or first scan to detect the position of document 16, the gyricon controller 42 rotates the bichromal rotating elements 22 to form black pixels 32 and a black background to the gyricon sheet 12 platen cover 10 behind the document 16. The document light source 58 will illuminate the document 16 through the transparent platen 18 against the black platen cover 10. Light will be absorbed by the black pixels and not reflect. Light will be reflected by the document 16 to the sensor 70. The controller 140 controls the sensor 70 to pick up an image of the document 16. Specifically, the sensor 70 will sense the edges 64, 66, 68 and 70 of the document in the contrast between the black pixels 32 of the gyricon sheet 12 platen cover 10 background and the white of the document 16.

Alternately, the gyricon controller 42 can sequentially rotate the bichromal rotating elements 22 from white pixels 34 to black pixels 32 across the gyricon sheet 12 platen cover 10 for the sensor 70 to sense the edges 64, 66, 68 and 70 of the document in the contrast between the black pixels 32 of the gyricon sheet 12 platen cover 10 background and the white of the document 16.

Using the data thus obtained by the sensor 70, the document map generator 130 generates a document map of the document 16 that is positioned between the platen 18 and the platen cover 10. This document map may indicate, for example, the size, location and/or orientation of the document. It may also indicate the location, shape and/or size of transparent portions of the document, such as document holes including punched holes, holes caused by tearing of the document, staple holes, torn-off corners of the document, and/or the like.

It should be appreciated that, the greater the density of the pixels and bichromal rotating elements of the platen cover gyricon sheet, the greater will be the precision of the document map generated by the document map generator 130.

Based on the document map from the document map generator 130, the digital image processor controller 140 through the gyricon controller 42 will rotate the bichromal rotating elements 22 of the platen cover gyricon sheet 12 to form white pixels 34 surround the edges 64, 66, 68 and 70 of the document 16 across the surface 26 of the platen cover 10 gyricon sheet 12 while maintaining the black pixels 32 behind the document 16 within the edges 64, 66, 68 and 70 of the document 16. The white pixels 34 of the gyricon sheet platen cover provide a high diffuse reflectance white background and the black pixels 32 of the gyricon sheet platen cover behind the document prevent show-through.

Figure 7:
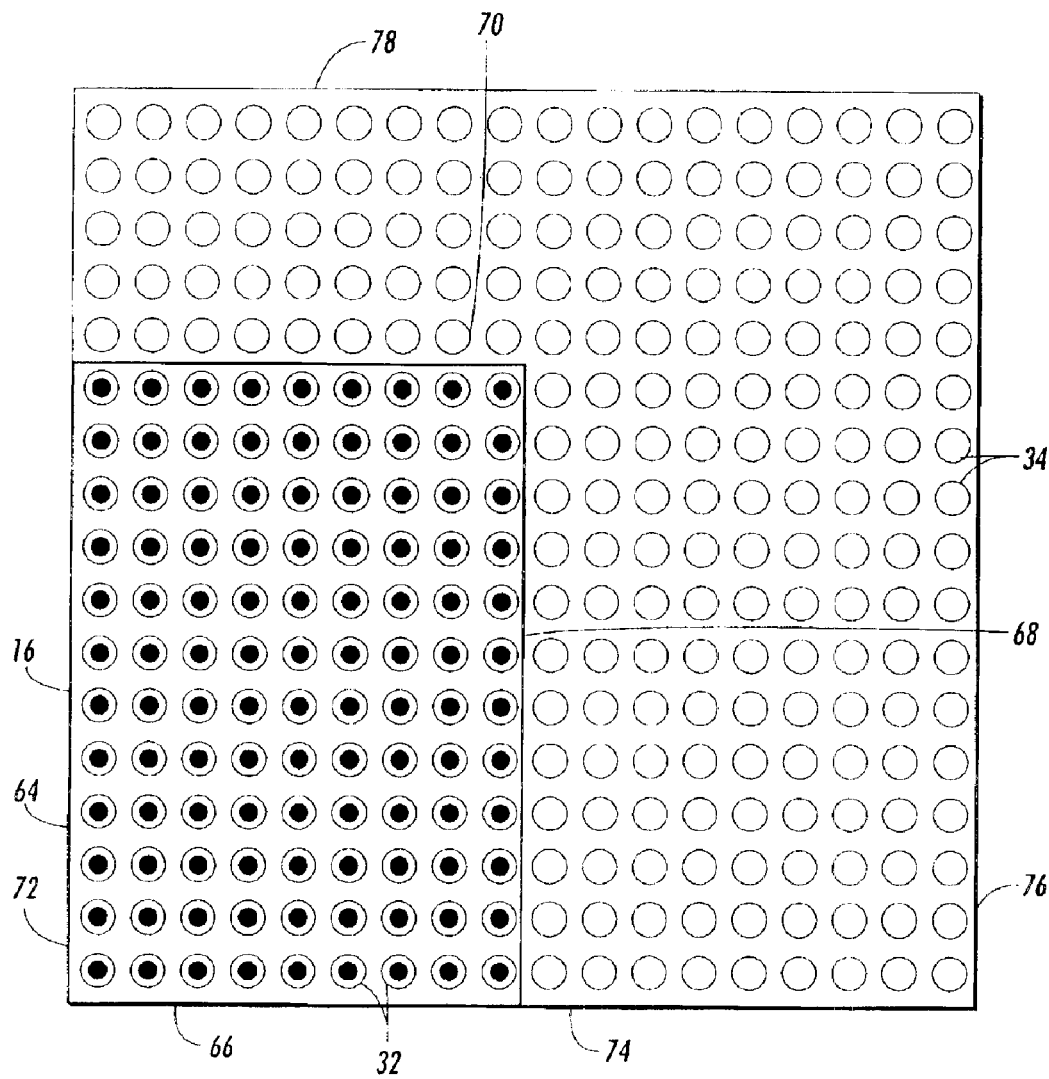
FIG. 7 is a front view of a document in the corner of the platen during scanning with a black pixel background from the gyricon sheet platen cover behind the document and a white pixel background surrounding the document in accordance with the present invention.

As shown in FIG. 7, the cornered document 16 of FIG. 3 has white pixels 34 surrounding the document 16 on sides 68 and 70 and black pixels 32 behind the document. The document map generator 130 and the digital image processor controller 140 can determine the document edge 64 against platen edge 72 and document edge 66 against platen edge 74 and position the black and white pixels accordingly.

Figure 8:
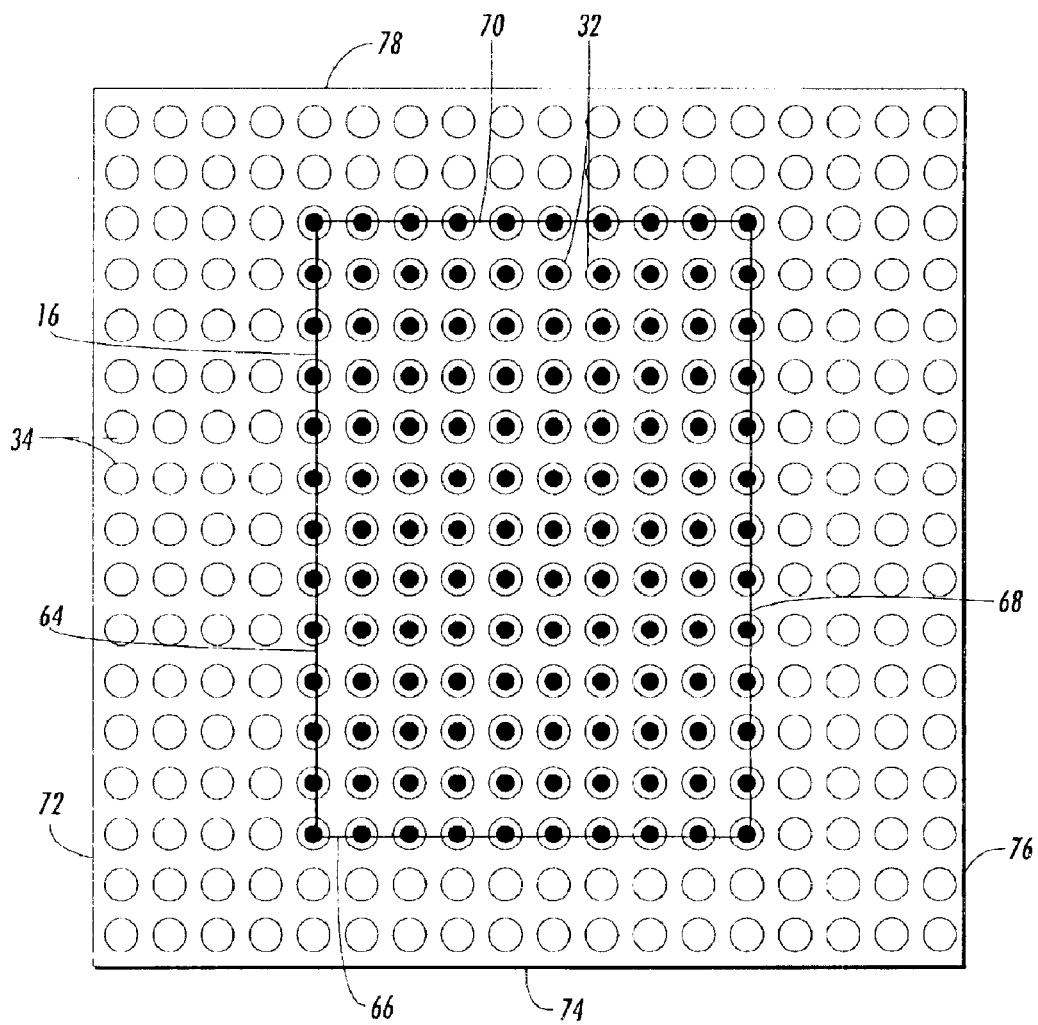
FIG. 8 is a front view of a document centered on the platen during scanning with a black pixel background from the gyricon sheet platen cover behind the document and a white pixel background surrounding the document in accordance with the present invention.

As shown in FIG. 8, the centered document 16 of FIG. 4 has white pixels 34 surrounding the document 16 on sides 64, 66, 68 and 70 and black pixels 32 behind the document.

Figure 9:
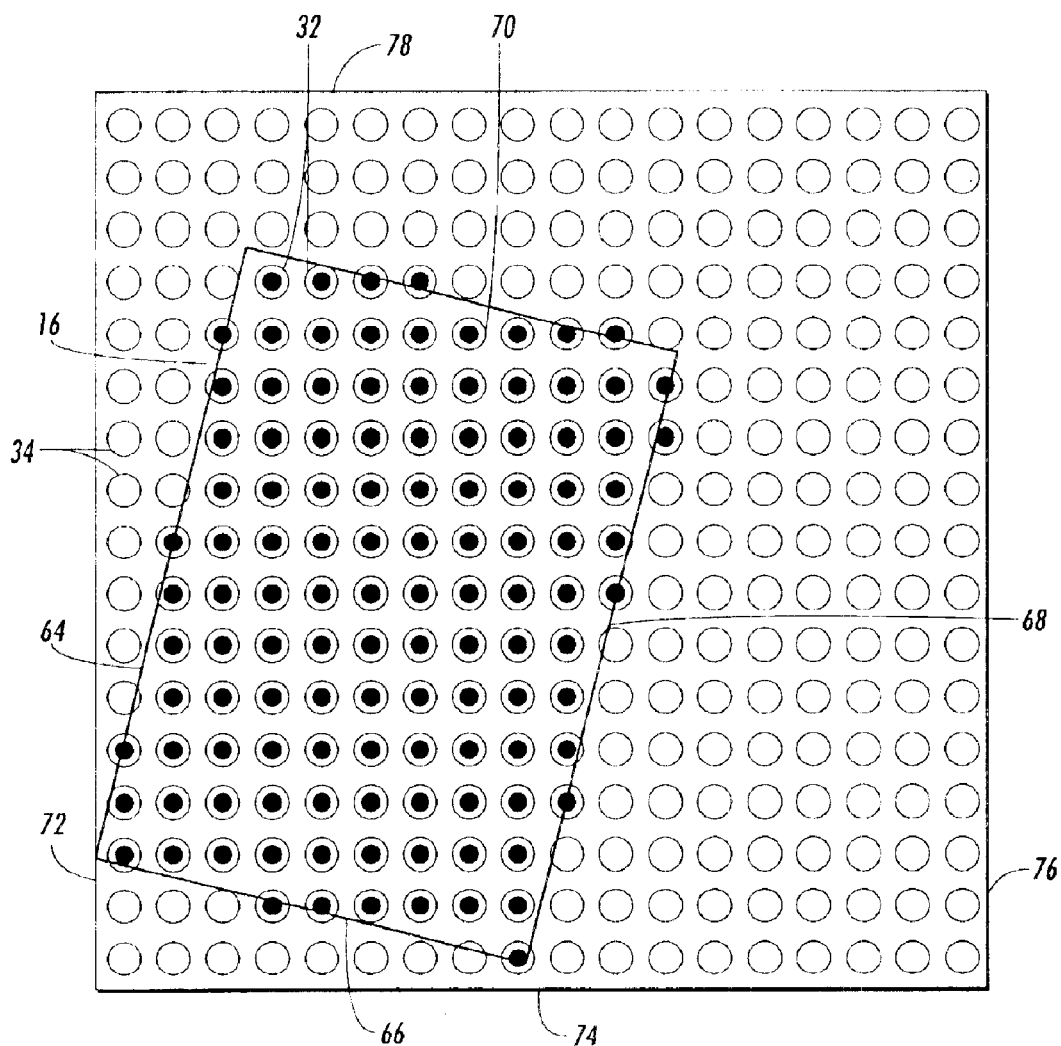
FIG. 9 is a front view of a document skewed on the platen during scanning with a black pixel background from the gyricon sheet platen cover behind the document and a white pixel background surrounding the document in accordance with the present invention.

As shown in FIG. 9, the skewed document 16 of FIG. 5 has white pixels 34 surrounding the document 16 on sides 64, 66, 68 and 70 and black pixels 32 behind the document, even with the skewed positioning of the document.

After the pre-scan, the digital scanner will next perform a full scan or second scan of the document so that a full digitization of the image on the document can be realized without show-through.

As best seen in FIGS. 1 and 6, the document light source 58 will illuminate the document 16 through the transparent platen 18 against the black platen cover 10. Light will be absorbed by the black pixels and not reflect. Light will be reflected by the document 16 to the sensor 70. The controller 140 controls the sensor 70 to pick up an image of the document 16. Picked-up image data from the document is then modified by the image data processor 150 according to the document map that has been generated by the document map generator 130. This image processing may include, for example, conventional deskewing, registering and/or resizing algorithms. Other image processing may include the replacement of image data from detected holes in the document with image data matching the document background surrounding the holes. This latter processing is particularly useful if the document background is not white.

After being processed by the image data processor 150, the image data is output along the data/control bus 160 through the input/output interface 110 to the data sink 170. The data may be stored in the memory 120 before, during and/or after processing by the image data processor 150, as necessary.

It should be understood that various components of the digital image processor 100 shown in FIG. 6, such as the document map generator 130, the controller 140 and the image data processor 150, can be implemented as portions of a suitably programmed general purpose computer. Alternatively, these components can be implemented as physically distinct hardware circuits within an ASIC, or using an FPGA, a PDL, a PLA, or a PAL, or using discrete logic elements or discrete circuit elements. The particular form each of the components shown in FIG. 6 will take is a design choice and will be obvious and predictable to those skilled in the art.

In general, the data sink 170 can be any known or later developed device that is capable of receiving data output by the digital image processor and either storing, transmitting or displaying the data. Thus, the data sink 170 can be either or both of a channel device for transmitting the data for display or storage or a storage device for indefinitely storing the data until there arises a need to display or further transmit the data.

The channel device can be any known structure or apparatus for transmitting data from the digital image processor 100 to a physically remote storage or display device. Thus, the channel device can be a public switched telephone network, a local or wide area network, an intranet, the Internet, a wireless transmission channel, any other distributing network, or the like. Similarly, the storage device can be any known structural apparatus for indefinitely storing image data such as a RAM, a hard drive and disk, a floppy drive and disk, an optical drive and disk, a flash memory or the like. For example, the data sink 170 may be a printer, a facsimile machine, a digital copier, a display, a host computer, a remotely located computer, or the like.

The memory 120 is preferably implemented using static or dynamic RAM. However, the memory 120 can also be implemented using a floppy disk and disk drive, a writable optical disk and disk drive, a hard drive, flash memory or the like.

The link 180 can be any known or later developed device or system for connecting the digital image processor 100 to the data sink 170, including a direct cable connection, a connection over a wide area network or a local area network, a connection over an intranet, a connection over the Internet, or a connection over any other distributed processing network or system. Further, it should be appreciated that the sink 170 may be connected to the digital image processor 100 directly, as a dedicated device.

While the data sink 170 is shown as a separate device from the digital image processor 100, the digital image processor 100 may be an integrated device, such as a digital copier, computer with a built-in printer, or any other integrated device that is capable of producing a hard copy image output. With such a configuration, for example, the data sink 170 and the digital image processor 100 may be contained within a single device. For example, in the case of a digital copier, the digital image processor 100 and the data sink 170 may be provided in the same machine. As another example, in the case of a scanner, the digital image processor 100 and the data sink 170, for example a printer or a computer memory, may be physically separate.

The present invention provides the ability to quickly switch the platen cover to black or white background and to selectively switch portions of the background to black or white. As described above, document edge detection can be performed while the cover is in the black background, and image scanning can performed after switching to the white background with a black background behind the document to prevent show-through, thereby achieving the advantages of both black and white backgrounds.

Various systems have been provided for automatic or semiautomatic feeding of documents to and over the scanner assembly 56 of the digital scanner 14. The documents are normally fed over the transparent platen, into a registered scanning position on the platen, and then off the platen by a document handling system. The transport of the document to the platen of the scanner assembly generally is accomplished by a first series of belts and/or rollers which engage the document to move it along a predetermined path in a registered fashion. The registered document is then delivered to a friction belt which moves the document over the platen.

Conventionally the document is desirably either center registered or corner registered by the document handler automatically at a preset registration position relative to the platen. If the document is not properly registered, then undesirable dark borders and/or edge shadow images may appear on the ensuing copy sheet, or information near an edge of the document may be lost, i.e. not copied onto the copy sheet. Document misregistration, especially skewing, can also adversely affect further feeding and/or restacking of the documents. The present invention can compensate and correct for skew positioning of the document on the platen as detailed earlier.

Such document handlers may comprise single or plural transport belts or feed wheels, utilizing frictional and/or vacuum sheet driving forces. Various combinations of such handlers are known with various registration devices or systems. Preferably the same platen document feeder is used to drive a document onto and off of the platen before and after scanning as well as registering the document.

Figure 10:
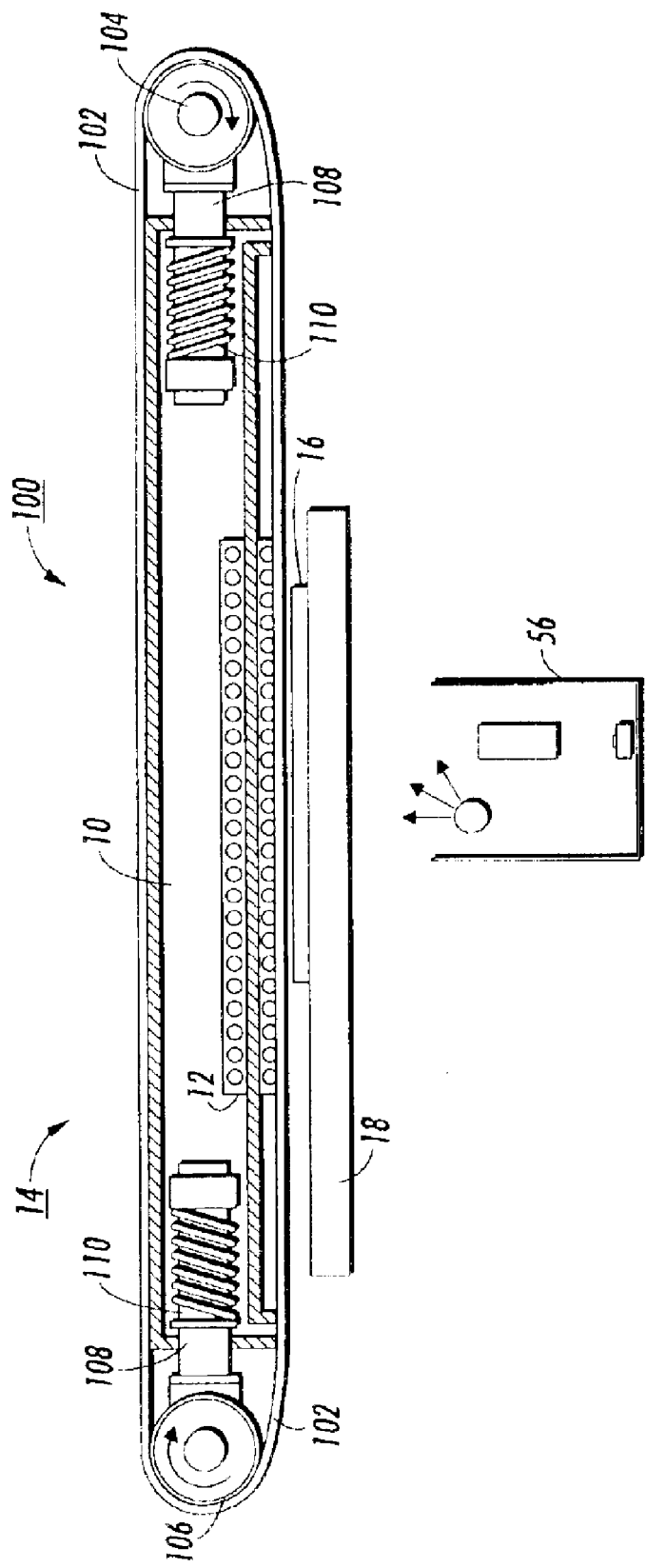
FIG. 10 is a side view of a document handling system with a belt transport and a gyricon sheet platen cover in accordance with the present invention.

As shown in FIG. 10, the document handler system 100 of the digital scanner 14 has a belt transport 102 for transporting documents 16 over the platen 18 of the scanning assembly 56 under the gyricon sheet 12 platen cover 10 closely overlying the platen 18. The document handling system 100 may be utilized in either a semi-automatic, fully-automatic, and/or recirculating document feeder.

The document handling system 100 includes a plurality of moving transport belts 102. The belts 102 are each narrow, endless loops of transparent, low frictional, non-elastomeric, plastic belts. Preferably, these belts 102 are uniformly made from a single layer of inexpensive, commercially available transparent polyester material.

The endless belt 102 is mounted on a first roller 104 and a second roller 106 on opposite ends of the platen cover 10. The rollers 104 and 106 are outside of the platen 18 area. The first roller 104 can be a common roller with the second roller 106 being an independent pivotable roller. Each of these rollers 106 is freely rotatable about its own cylindrical axis. Each roller 106 is rotatably mounted between the extending arms of a yoke 108. Each yoke 108 has a central mounting shaft 110, spring-loading it outwardly, to independently tension each belt 102 by the outward force applied to the roller 106.

The belt 102 rests on the platen 18 surface and is made of a material such as an inexpensive, flexible, transparent plastic and has a high coefficient of friction with paper type material. The transparent platen 18 surface will usually be smooth glass so that its coefficient of friction with the paper of a document 16 or belt 102 is relatively low. Consequently, a document 16 in the form of a material with a high coefficient of friction such as paper for example, will be effectively gripped by the belt 102 on its upper side and caused to slide over the platen 18 surface on its lower side under the control of the belt 102.

The document 16 will be fed into the document handler 100 and transported by the belt 102 to the platen 18. The document 16 will then be scanned by the scanner assembly 56 of the digital scanner 14.

The transparent belt 102 will be between the gyricon sheet 12 of the platen cover 10 and the document 16, the platen 18 and the scanner assembly 56. Thus, light from the light source of the scanner assembly and the white and black backgrounds of the gyricon sheet will be transmitted through the transparent belt of the document handling system.

The document 16 on the platen 18 will have a pre-scan or first scan with a black background from the gyricon sheet 12 and then a second or full scan with a white background surrounding the document and a black background behind the document to prevent show-through.

After scanning, the document 16 will then be transported by the belt 102 away from the platen 18. The endless belt 102 of the document handler is driven by a motor (not shown). The document can be fed from trays (not shown) to the platen to trays (not shown). The document handler 10 is synchronized with the control of the digital scanner 14 to automatically feed documents to the platen 18, register them, hold them in position until scanned and then remove them from the platen while feeding the next document to be scanned.

While the invention has been described in conjunction with specific embodiments, it is evident to those skilled in the art that many alternatives, modifications, and variations will be apparent in light of the foregoing description. Accordingly, the invention is intended to embrace all other such alternatives, modifications, and variations that fall within the spirit and scope of the appended claims.

What is claimed is:

1. A platen cover assembly for covering a document on a transparent platen of a scanner, comprising:

a platen cover; and a gyricon sheet located on a surface of said platen cover which is adjacent to said transparent platen; said gyricon sheet being adjustably controllable between a black background and a white background to provide a black background behind said document and a white background surrounding said document during scanning by said scanner.

2. The platen cover assembly of claim 1, wherein said gyricon sheet comprises:

a light transparent sheet having a two dimensional array of rotatable elements contained within liquid cavities, each rotatable element having a black surface and a white surface;

addressing means to apply an electric field to at least one rotatable element, whereby said at least one rotatable element will rotate to show either said black surface or said white surface, said black surface of said rotatable element forming a portion of said black background, said white surface of said rotatable element forming a portion of said white background.

3. A digital scanning system comprising:

a transparent platen;

illumination means for illuminating a document positioned on said transparent platen;

means for converting light reflected from said reflectance means and the document into digital image data; and means for providing a high reflectance background around and not behind said document and for providing a low reflectance background behind and not around said document.

4. The digital scanning system of claim 3 wherein said high reflectance background is white and said low reflectance background is black.

5. The digital scanning system of claim 3, wherein said means for providing a high reflectance background around said document and for providing a low reflectance background behind said document comprises:

a platen cover; and a light control structure located on a surface of said platen cover which is adjacent to the glass platen;

said light control structure being adjustably controllable for providing a high reflectance background around said document and for providing a low reflectance background behind said document.

6. The system of claim 3, wherein the means for providing the high reflectance background and the low reflectance background provides the high reflectance background and the low reflectance background simultaneously.

7. The digital scanning system of claim 3, further comprising:

means for detecting an edge of said document form said digital image data.

8. The digital scanning system of claim 7, further comprising:

means for printing said digital image data onto a recording medium.

9. The digital scanning system of claim 7, further comprising:

a document handling system including a transparent belt for transporting said document to said transparent platen and from said transparent platen.

10. The digital scanning system of claim 9 wherein said transparent belt is between said document and said platen cover.

11. The digital scanning system of claim 7, further comprising:

means for storing said digital image data.

12. The digital scanning system of claim 11 wherein said light control structure is a gyricon sheet.

13. The digital scanning system of claim 12 wherein said gyricon sheet comprises:

a light transparent sheet having a two dimensional array of rotatable elements contained within liquid cavities, each rotatable element having a black surface and a white surface;

addressing means to apply an electric field to at least one rotatable element, whereby said at least one rotatable element will rotate to show either said black surface or said white surface, said black surface of said rotatable element forming a portion of said black background, said white surface of said rotatable element forming a portion of said white background.

14. A method for digitally scanning a document, comprising the steps of:

providing a black background surrounding and behind said document;

scanning said black background and said document;

determining the edges of said document;

providing a white background around said document and a black background behind said document;

scanning said document; and producing digital image data relating to an image on said document.

* * * * *